United States Patent
Kunemund

(10) Patent No.: US 7,549,068 B2
(45) Date of Patent: Jun. 16, 2009

(54) DATA PROCESSING APPARATUS AND METHOD FOR OPERATING A DUAL RAIL CIRCUIT COMPONENT IN A SECURITY MODE AND POWER SAVING MODE

(75) Inventor: Thomas Kunemund, Munich (DE)

(73) Assignee: Infineon Technologies AG (DE)

( * ) Notice: Subject to any disclaimer, the term of this patent is extended or adjusted under 35 U.S.C. 154(b) by 426 days.

(21) Appl. No.: 11/115,985

(22) Filed: Apr. 27, 2005

(65) Prior Publication Data
US 2005/0241005 A1 Oct. 27, 2005

(30) Foreign Application Priority Data
Apr. 27, 2004 (DE) .................. 10 2004 020 576

(51) Int. Cl.
G06F 1/00 (2006.01)
G06F 1/32 (2006.01)
H03K 19/00 (2006.01)

(52) U.S. Cl. ............................ 713/320; 713/300; 326/8

(58) Field of Classification Search ................ 713/300, 713/320, 324, 330; 726/36; 365/189.05, 365/226, 227; 307/31, 32; 326/8
See application file for complete search history.

(56) References Cited

U.S. PATENT DOCUMENTS

| | | | |
|---|---|---|---|
| 6,359,832 B2 * | 3/2002 | Dietrich et al. ............. 365/233 |
| 6,419,159 B1 * | 7/2002 | Odinak ...................... 235/492 |
| 6,437,623 B1 * | 8/2002 | Hsu et al. .................... 327/202 |
| 6,498,404 B1 * | 12/2002 | Thuringer et al. ............ 307/32 |
| 7,106,091 B2 * | 9/2006 | Gammel ........................ 326/8 |
| 7,127,620 B2 * | 10/2006 | Boeckeler ................... 713/194 |
| 7,290,289 B2 * | 10/2007 | Janke et al. .................. 726/34 |
| 2002/0079942 A1 * | 6/2002 | Proebsting ................... 327/277 |
| 2002/0099965 A1 * | 7/2002 | Yang ........................... 713/322 |
| 2003/0030417 A1 * | 2/2003 | Takabayashi ................ 323/223 |
| 2003/0084336 A1 * | 5/2003 | Anderson et al. ............ 713/200 |
| 2004/0039908 A1 * | 2/2004 | Rose et al. .................... 713/168 |
| 2004/0047470 A1 * | 3/2004 | Candelore .................... 380/240 |
| 2004/0160834 A1 * | 8/2004 | Aoki ........................... 365/200 |
| 2004/0186979 A1 * | 9/2004 | Janke et al. ..................... 712/1 |

(Continued)

FOREIGN PATENT DOCUMENTS

DE 101 36 335 A1 2/2003

(Continued)

OTHER PUBLICATIONS

Saputra, H, "Masking the Energy Behavior of DES Encryption". Jun. 2003. Proceedings of the Design, Automation and Test in Europe Conference and Exhibition.*

(Continued)

Primary Examiner—Mark Connolly
(74) Attorney, Agent, or Firm—Dickstein, Shapiro, LLP.

(57) ABSTRACT

A data processing apparatus having a dual rail circuit component and a control unit for production of drive signals for the dual rail circuit component. The control unit receives an operating mode selection signal, and drive signals for the connected dual rail circuit component are produced as a function of the operating mode selection signal. The circuit components are operated in a security mode or in a power saving mode as a function of the drive signals, with security measures being deactivated in the power saving mode.

11 Claims, 6 Drawing Sheets

U.S. PATENT DOCUMENTS

| | | | |
|---|---|---|---|
| 2005/0094640 A1* | 5/2005 | Howe | 370/395.1 |
| 2006/0098476 A1* | 5/2006 | Kunemund | 365/154 |
| 2006/0288239 A1* | 12/2006 | Pessolano | 713/300 |
| 2007/0106906 A1* | 5/2007 | Koike et al. | 713/189 |

FOREIGN PATENT DOCUMENTS

| | | |
|---|---|---|
| DE | 102 02 726 A1 | 8/2003 |
| DE | 102 44 738 B3 | 3/2004 |
| WO | WO-03/010638 A1 | 2/2003 |
| WO | WO-03/088488 A2 | 10/2003 |

OTHER PUBLICATIONS

Yu, An. "A Clock-less Implementation of the AES Resists to Power and Timing Attacks". Apr. 2004. Proceedings of the International Conference on Information Technology: Coding and Computing.*

* cited by examiner

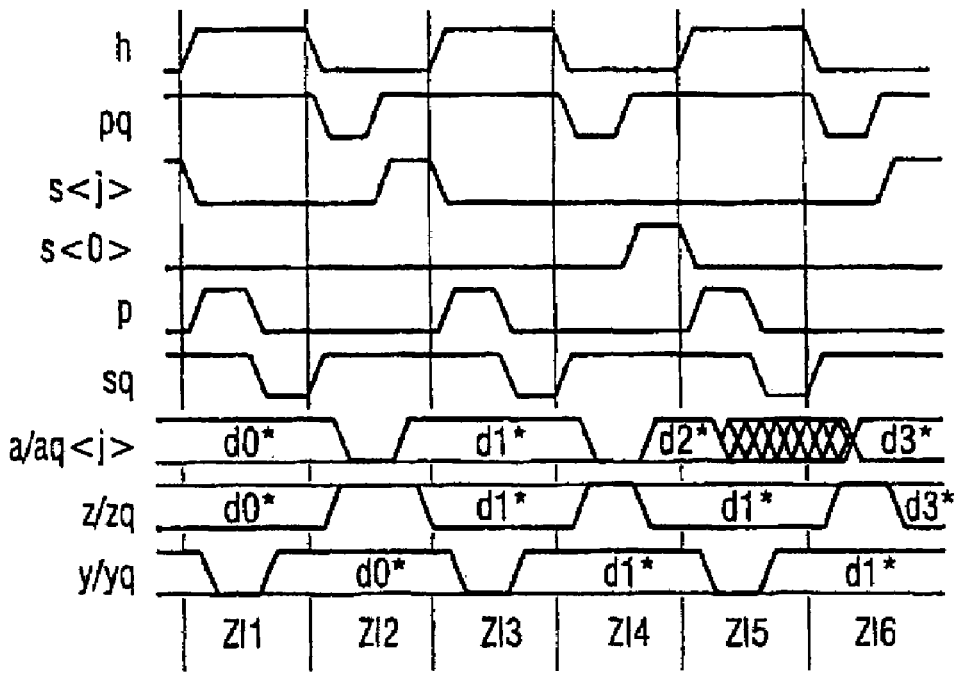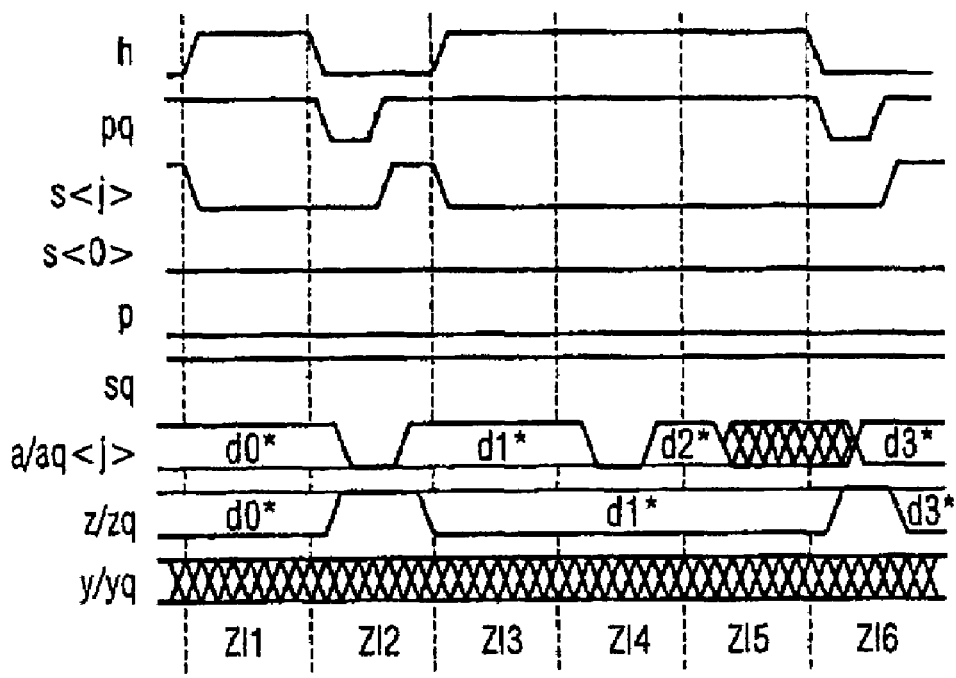

DATA PROCESSING APPARATUS AND METHOD FOR OPERATING A DUAL RAIL CIRCUIT COMPONENT IN A SECURITY MODE AND POWER SAVING MODE

CROSS-REFERENCE TO RELATED APPLICATION

This application claims priority to German Patent Application Serial No. 10 2004 020 576.0, filed Apr. 27, 2004, and which is incorporated herein by reference in its entirety.

FIELD OF THE INVENTION

The invention relates to a data processing apparatus having at least one dual rail circuit component and a control unit for production of drive signals for the dual rail circuit components. The invention also relates to a method for operation of a dual rail circuit component.

BACKGROUND OF THE INVENTION

So-called dual rail circuit technology is a circuit arrangement design whose security aspects have been improved, in particular for data processing apparatuses. Circuits are normally designed using so-called single rail circuitry. In this case, switching networks are constructed microelectronically such that each bit of the information to be processed is physically represented by one, and only one, electrical node. Switching networks such as these are relatively insecure with regard to so-called differential current profile analysis, which is often used when unauthorized third parties are attempting to gain access to secret information. Differential current profile analysis, which is also referred to as differential power analysis (DPA), is one of the most important methods for attacking, by way of example, smart cards for security applications. For a given program or a given algorithm, current profiles of the smart card, measured using statistical methods, or their charge integrals calculated over one or more clock cycles are evaluated, by which means conclusions can be drawn about information to be protected—for a large number of program versions—from the correlation between systematic data variations and the respective charge integral.

One possible way to make DPA attacks at least considerably more difficult is to interchange or to transmit data between subsystems of an integrated circuit as far as possible only in an encrypted form. One crypto system which is suitable for this purpose is so-called one time pad encryption. Keys obtained from random sequences are linked bit-by-bit via an XOR logic operation with texts to be transmitted. An XOR logic operation is once again carried out for decryption. For the one time pad crypto system, it is important that each key sequence is used only once for encryption and decryption, because, otherwise, information about clear texts can be determined using statistical methods.

This "encrypted calculation" in single rail circuitry requires a very high degree of circuitry complexity and therefore occupies a large surface area, however, and in consequence consumes more power. Dual rail circuitry is used in order to avoid the requirements for encryption. From what has been stated above with regard to differential current profile analysis, it follows that the circuit components provided on an integrated circuit to resist DPA attacks should ideally be designed such that they always produce the same current profile irrespective of the data to be processed. However, this is not necessarily the case for single rail implementations, because the charge integral associated with the time profile of the states of a circuit is a function of those nodes or electrical capacitances whose charges are electrically reversed, that is to say it is highly dependent on the changes in the data to be processed over time.

In the case of dual rail circuitry, in contrast to conventional single rail circuitry, each bit is represented by two nodes k and kq, with a transmitted bit having a valid logical value when k corresponds to the true logical value b of this bit and kq corresponds to the negated value bn=not(b).

Thus, if the intention is to transmit the value b=1, then this is done by means of a "1" in the node k. However, the value "0" is transmitted at the same time at the node kq, so that both a "1" and a "0" are thus transmitted overall. If the value b=0 is to be transmitted, the value "1" is transmitted at the same time at the node kq. A "1" and a "0" are thus transmitted in both cases. Assuming physical equivalence of the nodes k and kq, it is now no longer possible to identify by means of differential current profile analysis whether a "1" or a "0" has been transmitted as the data item. However, this is true only when a signal change actually takes place for each transmitted data item, that is to say the information item "1" alternates with the information item "0". If two or more identical data items are transmitted successively, the capability to resist attacks by differential current profile analysis deteriorates.

The desired invariance of the charge integrals is now achieved by inserting a so-called precharge state, also referred to as precharge, between in each case two states with valid logical values (b, bn)=(1,0) or (0,1), for which both k and kq are charged to the same electrical potential, that is to say assume logically invalid values (1,1) or (0,0). A state sequence for the precharge state (1,1) could thus appear as follows:

(1,1)→(0,1)→(1,1)→(1,0)→(1,1)→(1,0)→(1,1)→(0,1)→...

For any given character sequence such as this, it can be stated that one, and only one, node has its charge reversed from "1" to "0" for each transition (1,1)→(b, bn), and one, and only one, node changes from "0" to "1" for all (b, bn)→(1,1), irrespective of the logically valid value b of the state bit in question. An analogous situation applies to state sequences with the precharge state (0,0).

This means that the charge integrals which correspond to these state sequences are independent of the sequence (b, bn) of the logically valid values if care is taken to ensure that the nodes k and kq have the same electrical capacitances. The current profile of a data path implemented in this way therefore does not depend on time variations of the data to be processed, and is thus resistant to differential current profile analysis.

One example of a dual rail implementation of a circuit component is known from DE 102 02 726 A1. The integrated circuit that is proposed there is a register in a data path. The proposed circuit arrangement is designed consistently with dual rail technology and thus forms a charge-neutral register.

One problem with the use of circuit components using dual rail circuit technology is that a considerably greater amount of power is consumed.

SUMMARY OF THE INVENTION

An object of the invention is to specify a data processing apparatus which on the one hand is secure against DPA attacks and on the other hand consumes less power. A further aim is to specify a method by means of which a dual rail circuit component can be operated on an energy-efficient basis.

This object is achieved by a data processing apparatus of the type mentioned initially, in which the control unit is designed to receive an operating mode selection signal, drive signals for connected dual rail circuit components are produced as a function of the operating mode selection signal, and the circuit components can be operated in a security mode or in a power saving mode as a function of the drive signals, with security measures being deactivated in the power saving mode.

With regard to the method, the object is achieved by a method of the type mentioned initially in which the dual rail circuit component is alternatively operated in a security mode or in a power saving mode, with security measures being deactivated in the power saving mode. In consequence, a large amount of power is consumed only when critical operations are being carried out and a high degree of security against attacks is required. The mean current drawn thus falls considerably without having to accept reduced security.

BRIEF DESCRIPTION OF THE DRAWINGS

The invention will be explained in more detail in the following text with reference to exemplary embodiments. In the figures:

FIG. 6 shows a diagram illustrating the time signal profiles of the circuit arrangement in FIG. 4 in the security mode; and FIG. 7 shows a diagram illustrating the time signal profiles of the circuit arrangement in FIG. 4 in the power saving mode.

DETAILED DESCRIPTION OF PREFERRED EMBODIMENTS OF THE INVENTION

In a data processing apparatus according to an embodiment of the present invention, a control unit is designed to receive an operating mode selection signal, drive signals for connected dual rail circuit components are produced as a function of the operating mode selection signal, and circuit components can be operated in a security mode or in a power saving mode as a function of the drive signals, with security measures being deactivated in the power saving mode.

SPA-sensitive and DPA-sensitive circuit components for the data processing apparatuses according to the invention are designed using an upgraded form of dual rail circuitry. In this upgraded embodiment, the components can be operated in different operating modes, specifically in a so-called security mode or in a so-called power saving mode.

In the security mode, the activity of the subsystems of a data processing apparatus for security applications does not depend on the data to be processed, and periodically occurring precharge phases and discharge phases are provided. The precharge phases and discharge phases are preferably also provided in circuit parts for whose operation these precharge phases and discharge phases are not required. In contrast, in the power saving mode, all the subsystems which are not actually required for the operation of the data processing apparatus are made inactive, for example by being disconnected from the clock supply. The components consume only a minimum amount of power in the inactive state. The precharge processes and discharge processes which are typical of dual rail systems are carried out only in circuit parts for whose operation the precharge phases and discharge phases are required. The power which is required for precharging and discharging is saved in the other circuit parts.

In one advantageous embodiment of a data processing apparatus according to the invention, the dual rail circuit component is a storage apparatus with a precharging unit which can be deactivated while reading data.

In another advantageous refinement, the dual rail circuit component is a data path register which is designed to dynamically freeze register states, with the control unit being designed to produce a control signal combination in which static freezing rather than dynamic freezing takes place.

Figure 1:
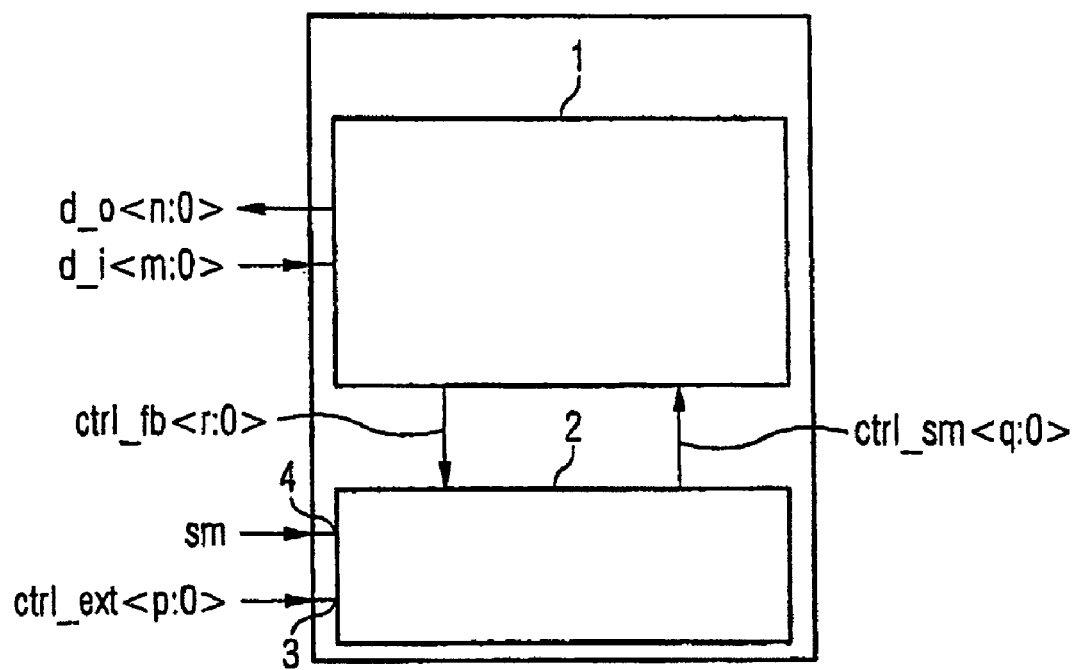
FIG. 1 shows a block diagram of a data processing apparatus according to the invention.

FIG. 1 shows a block diagram of a circuit arrangement according to the invention. The illustrated circuit arrangement has a dual rail circuit component 1 and a control unit 2. On the input side, the control unit 2 has a first input 3 for a control signal ctrl_ext<p:0> and a second input 4 for an operating mode selection signal sm. The control signal $ctrl_{13}$ ext<p:0> comprises, for example, clock, set/reset, address and control signals. The additional control signal sm at the second input 4 indicates what operating mode is intended to be selected, that is to say a security mode or a power saving mode. For this purpose, control signals ctrl_sm<q:0> are produced and are applied directly to the dual rail circuit component which is, for example, a data path circuit or storage circuit. The control signals are in this case produced either for operation in the power saving mode or for operation in the security mode. If sm=0, the ctrl_sm<q:0> is produced for operation in the power saving mode, and if sm=1, it is produced for operation in the security mode. One advantageous feature in this case is that drive signals often have to be produced in any case for dual rail circuit components. Thus, ideally, no change is required to the hardware configuration of the dual rail circuit component and, instead, the desired operating mode switching can be achieved by suitable production of the drive signals for the dual rail circuit component, as a function of the operating mode selection signal.

In this case, in order to produce the ctrl_sm<q:0>, it may also be advantageous to use feedbacks ctrl_fb<r:0> of the data path circuit and/or storage circuit to be controlled by the control signals ctrl_sm<q:0>.

Figure 3:
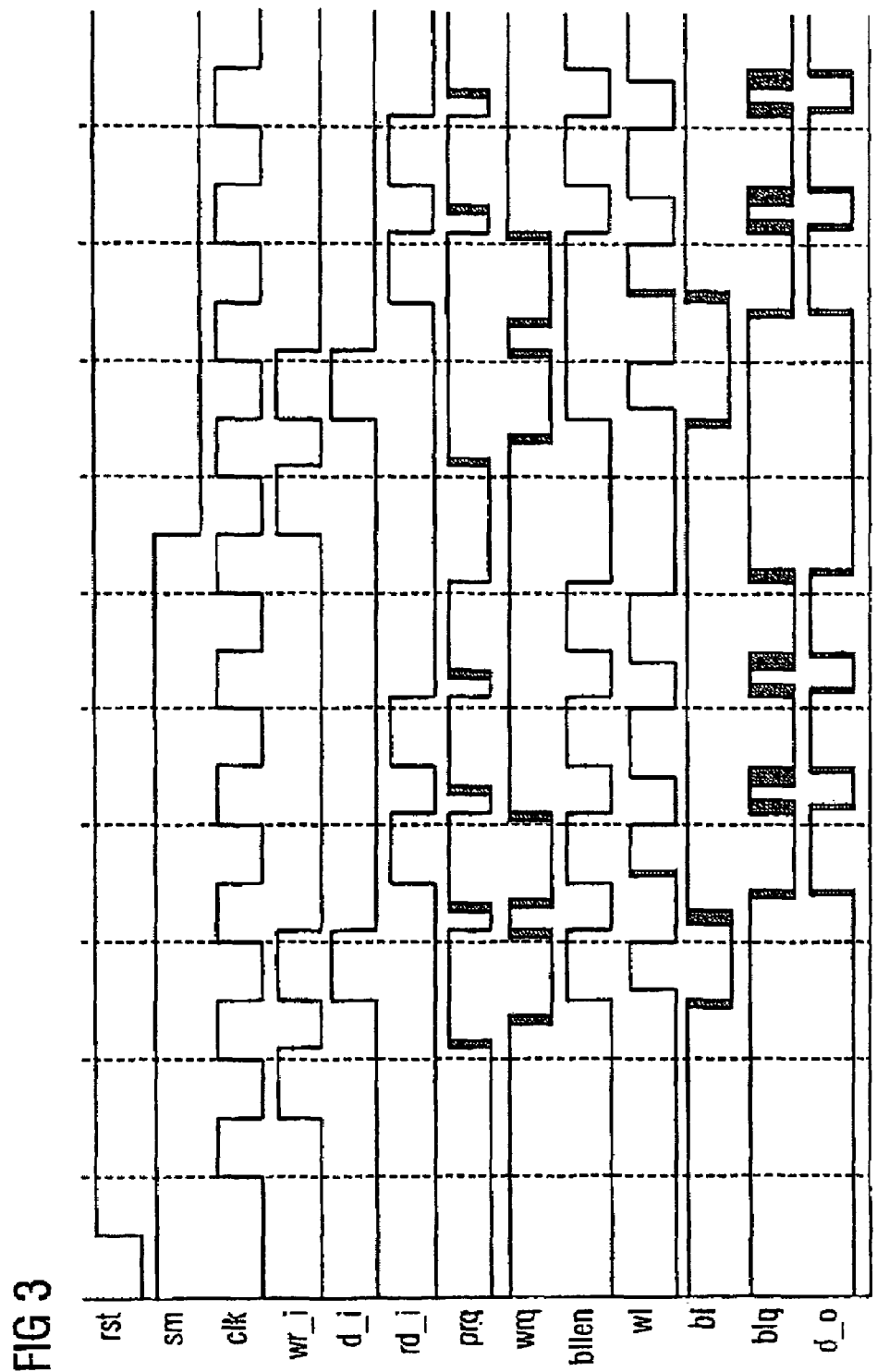
FIG. 3 shows a diagram illustrating the time profile of signals in the circuit arrangement shown in FIG. 2.

A first specifically exemplary embodiment is illustrated in FIG. 3. This is a "dual mode SRAM", that is to say a RAM which can be operated either in the security mode or in the power saving mode. The special measure in the power saving mode is that the precharge on the bit lines to be provided with a precharge for dual rail technology need be carried out only before read accesses, since this is the only case in which it is required for operation of the circuit, but not before write accesses. In contrast, in the security mode, the precharge is carried out before every access.

Figure 2:
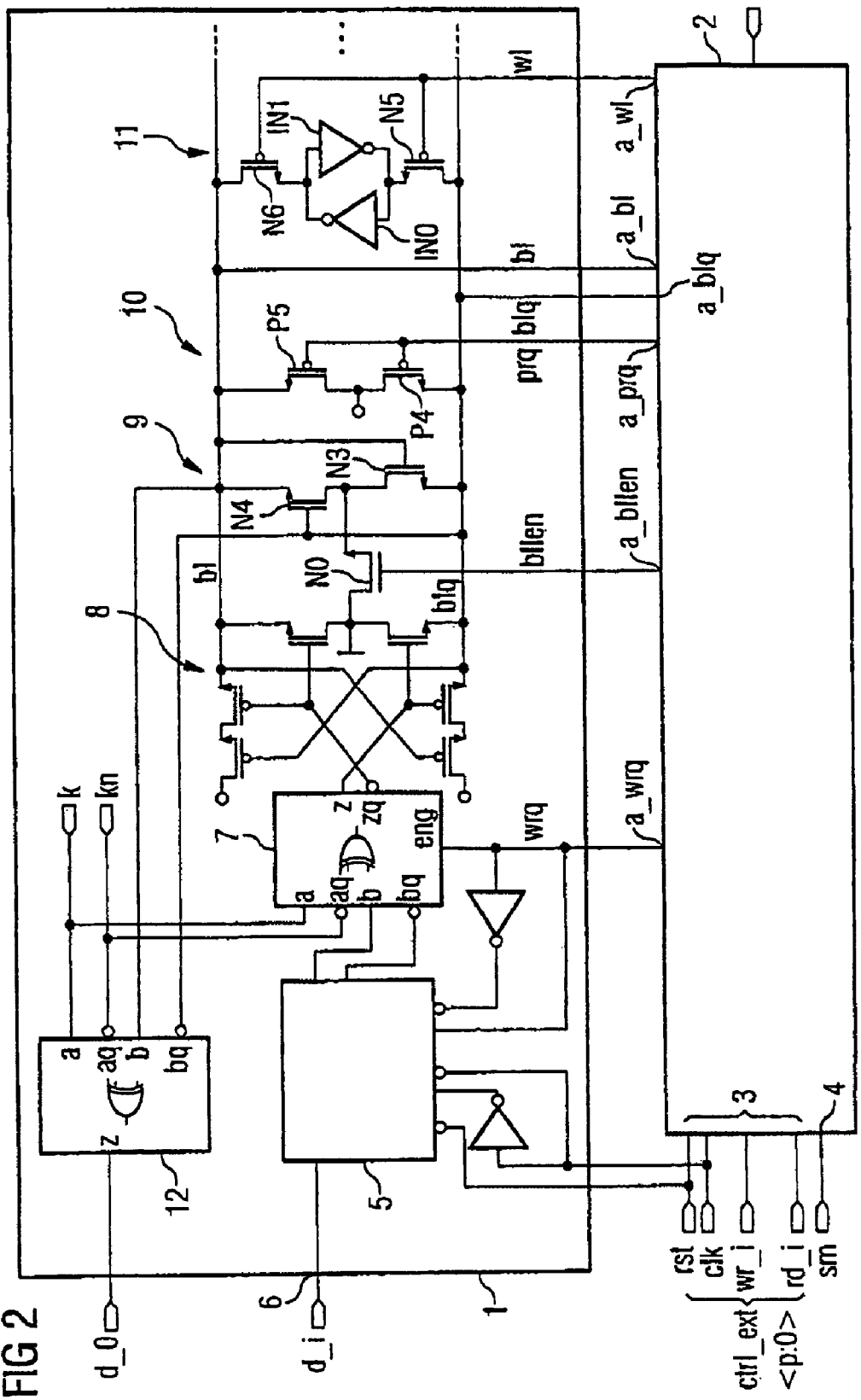
FIG. 2 shows a first exemplary embodiment of a data processing apparatus according to the invention with a store which can be operated in two operating modes.

One such "dual mode SRAM" is illustrated in FIG. 2. The illustrated circuit arrangement has a control unit 2, a master slave register 5 for a data input 6 to which a data signal d_i is applied, and an XOR gate 7 for decryption of received data using a key k, kn. Data applied to the data input 6 is thus first of all passed to the master slave register 5, which acts as a buffer, and is then passed to the XOR gate 7. In the master salve register 5, the applied data signal d_i is used to produce a dual rail signal which is applied to inputs b, bq of the XOR gate. The key k, kn is likewise passed as a dual rail signal to the inputs a, aq of the XOR gate 7. The XOR gate 7 furthermore has an enable input enq. The output signal from the XOR gate 7 is produced at outputs z, zq. The XOR gate 7 is followed by a driver circuit 8 for write accesses. This circuit is used mainly to provide protection against parallel currents. The driver circuit 8 is followed by a switchable storage cell 9 with n-channel transistors N0, N3 and N4, which can be driven by the control unit 2 via a control signal bllen. The purpose of the storage cell 9 is to retain an information item that is produced on the lines bl, blq at the output of the driver circuit 8 in the situation where neither a precharge nor a write or read access is activated.

The storage cell 9 is followed by a precharge unit 10, which has two p-channel transistors P4 and P5. The precharge unit 10 can be driven by the control unit 2 via a precharge control signal prq. The precharge unit 10 is followed by a 6-transistor SRAM cell 11. This comprises n-channel transistors N5 and N6, as well as inverters IN0 and IN1. The single illustrated storage cell 11 is representative of any desired number of storage cells which can be arranged along the bit line pair bl, blq.

The SRAM storage cells 11 and the upstream components can be driven by the control unit 2 using a number of signals. The external control signal ctrl_ext<p:0> shown in FIG. 1, which is applied to the first control input 3, has corresponding signals in FIG. 2 in the form of the signals rst, clk, wr_i and rd_i, with rst being a reset signal, clk being a clock signal and wr_i and rd_i being signals for activation of write and read accesses, respectively. The control unit 2 has outputs a_wrq, a_bllen, a_prq and a_wl via which signals prq, bllen, prq and wl can be emitted to the SRAM storage device. These signals correspond to the control signal ctrl_sm<q:0>, which is illustrated in FIG. 1.

As a further connection, the bit lines bl, blq are fed back to the control unit 2. The signals transmitted there correspond to the signal ctrl_fb<r:0>, which is shown as a feedback signal in FIG. 1.

The control unit 2 is designed such that the signals prq, bllen, prq and wl are produced as a function of the control signal sm such that, when sm=0, the SRAM storage device 1 operates in the power saving mode, that is to say the precharge unit 10 is activated only when this is necessary for operation of the SRAM storage device 1. When sm=1, in contrast, the SRAM storage device 1 is driven such that a precharge process is carried out for each write and read process.

In order to read data, the bit lines bl, blq are connected to inputs b, bq of a driver circuit 12 which uses the dual rail signal applied to the inputs b, bq to produce an output signal d_0, which is produced at an output z of the driver circuit 12. The illustrated embodiment of the driver circuit 12 likewise has an XOR gate in order to make it possible to encrypt the data to be emitted. The driver circuit 12 is supplied with a key k, kn at the inputs a, aq for encryption purposes.

FIG. 3 shows the time sequence of the signals as they occur in the circuit arrangement shown in FIG. 2.

When sm=1, the precharge control signal prq is activated by the rising edge of the clock signal clk when a write or read access has taken place in the previous clock cycle. If no write or read access has taken place in the previous clock cycle, the precharge control signal prq remains active. Once the precharge has been deactivated, the data to be written for a write access is passed to the lines bl, blq, and the signal wl is then activated on the word line a_wl. The signal wl is activated immediately for read accesses.

When sm=0, the power saving mode is selected, and the precharge is activated via the precharge control signal prq only for read accesses in the same clock cycle, with the rising edge of the clock signal clk. Once the precharge has been deactivated, the signals on the word lines a_wl are then activated immediately. In the case of a write access, the data is written to bl, blq, and the word lines a_wl are then activated. The precharge process which is not carried out in this case before the access process leads to the desired power saving.

A second exemplary embodiment of a circuit arrangement according to the invention as shown in FIGS. 4 to 7 relates to registers in data paths for security applications. Charge-neutral registers are known, for example, from DE 102 02 726 A1.

In every modern microprocessor or microcontroller, states which make it necessary to temporarily interrupt the program sequence occur during the step-by-step processing of an algorithm. This may, for example, be because instructions or data items are not yet available. If possible, the interruption should be handled in such a way that the existing information at the time of the interruption, or the existing data, is or are completely retained. The states reached in the program sequence—including intermediate results which have already been calculated—must therefore be "frozen" for each of the subsequent steps in the algorithm, in such a way that the program sequence can be continued with minimal delay as soon as the information required for this purpose, that is to say the previously missing instruction or the missing data item, becomes available.

Figure 4:
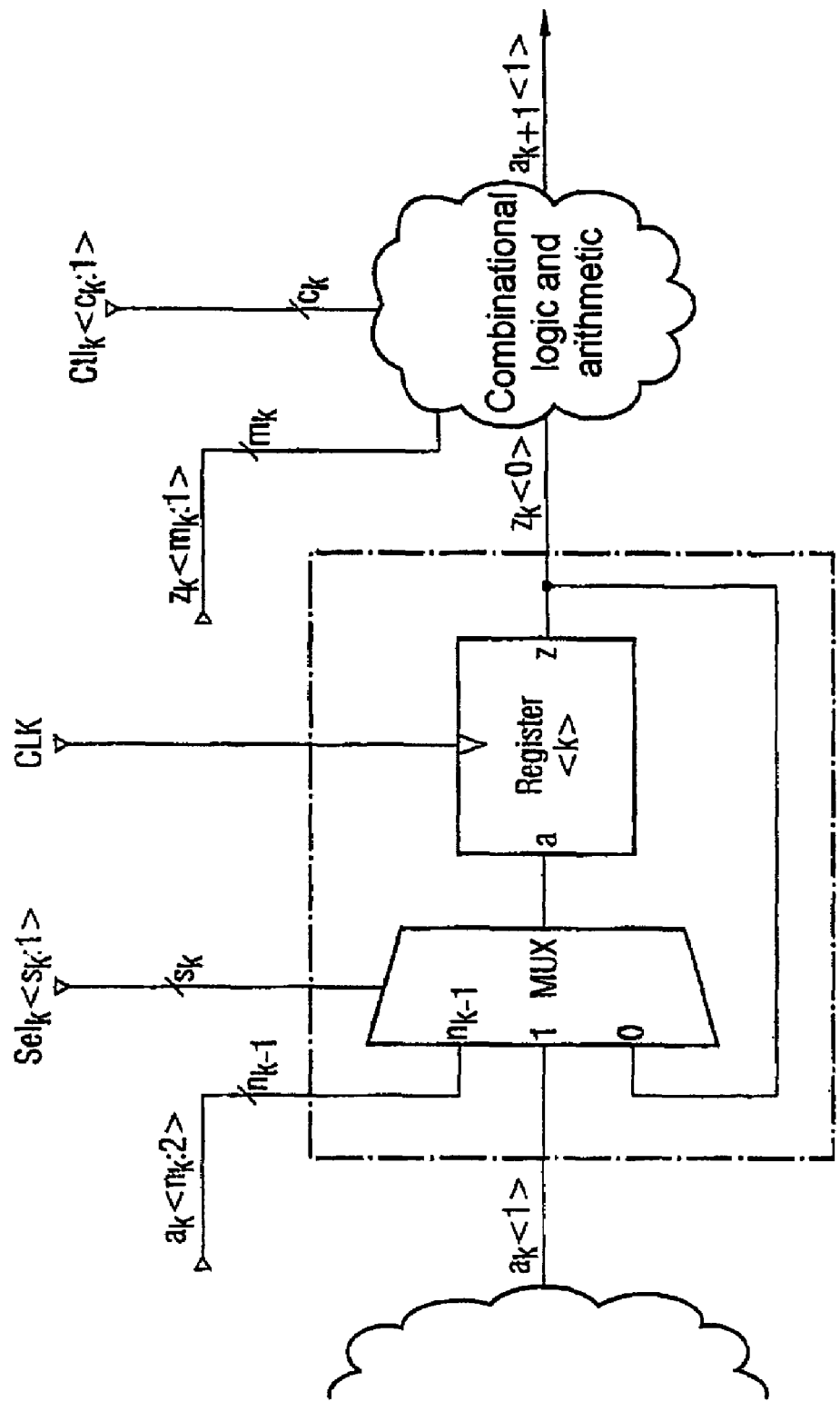
FIG. 4 shows a schematic illustration of a data path register according to the prior art.

This situation is illustrated schematically in the form of circuitry in FIG. 4. Only one bit of a data path and only one sub-step (k) of a program sequence are illustrated in this case. The states or intermediate results $z_k$ which correspond to the sub-steps k=1, 2, . . . of the processing of the program are either calculated in arithmetic/logic circuits from $z_k-1$ as well as control signals $ctl_k$ (data signal $a_k<1>$), are transferred from adjacent bits in the data path, or are supplied from the outside ($a_k<n_k:2>$) and are then stored in respectively associated register circuits, which each have a clock input. The described "freezing" of the register contents $z_k$ which correspond to the states is provided by feedback comprising the data output of the register <k> being connected to the multiplexer circuits upstream of the input to the registers. Each of the multiplexer circuits in this case has a control input, to which a control signal $sel_k<s_k:1>$ is applied.

Figure 5:
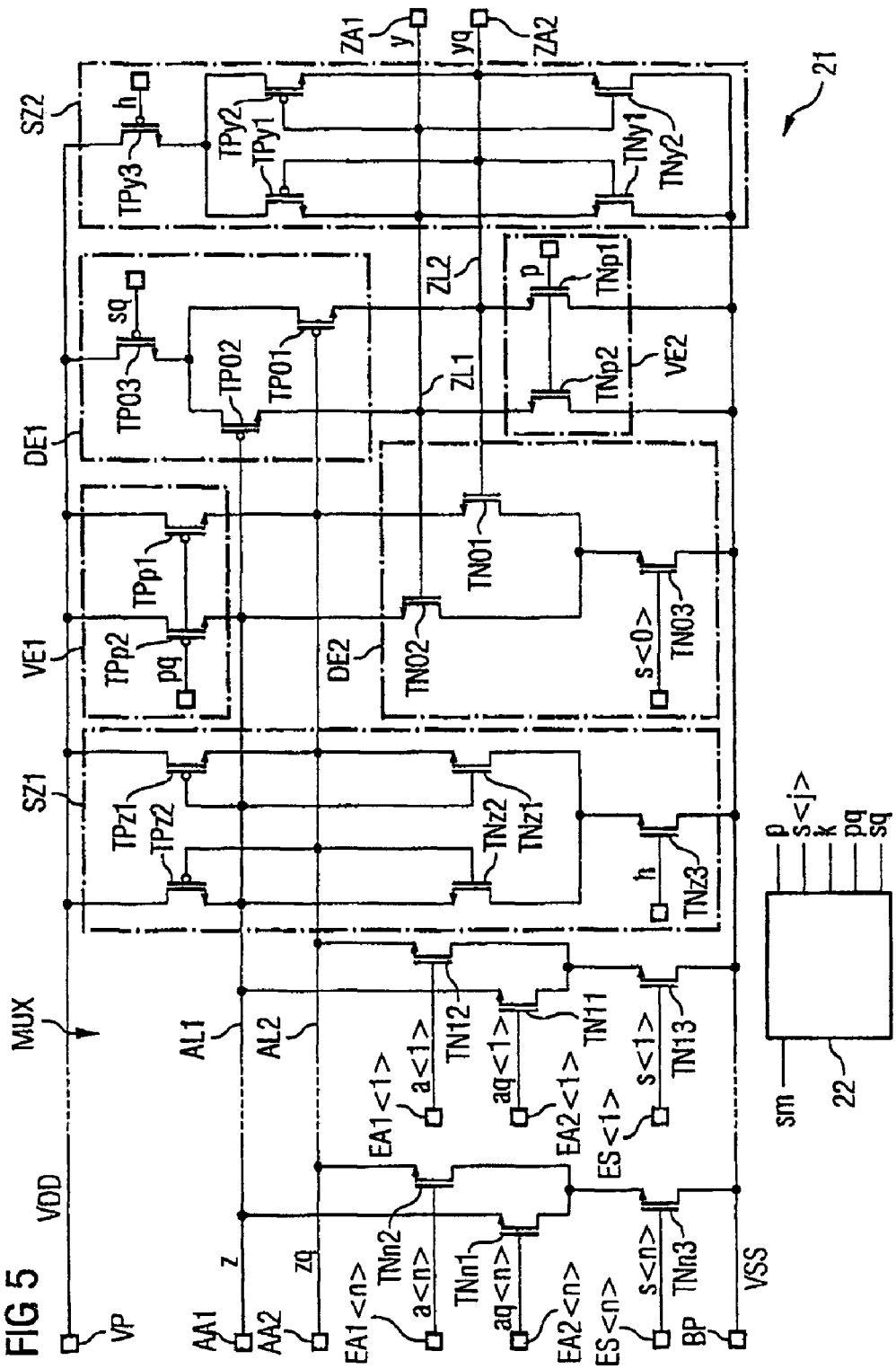
FIG. 5 shows a dual rail implementation of the circuit arrangement shown in FIG. 4.

The combination of the multiplexer and register is surrounded by a dashed line in FIG. 4. FIG. 5 illustrates one specific circuit arrangement using dual rail circuitry with this functionality. The reference symbols TP, TN which denote the respective transistors refer to p-channel transistors and N-channel transistors. The notation <1>, . . . <n> in each case denotes one data path. The value in angled brackets represents the j-th bit, where j=1 . . . n.

The circuit arrangement can be operated in a security mode or in a power saving mode. The active operating mode is controlled via drive signals, which have to be provided in any case, from a control unit 22. The operating mode for which the drive signals are produced depends on the operating mode selection signal sm (see FIG. 1). The time response of the data and control signals is shown in FIGS. 6 and 7, with FIG. 6 showing the response in the security mode, that is to say when sm=1, and FIG. 7 showing the response in the power saving mode, when sm=0.

The integrated circuit has input connections (EA1<j>, EA2<j>, where j=1 . . . n. Two input connections EA1<j>, EA2<j> are provided for each bit or each data path. The logically valid signal a<n> is applied to the input connection EA1, while the complementary signal aq<j> is applied to the input connection EA2. The input connections EA1<j> and EA2<j> are respectively connected to control connections of transistors TNj2, TNj1. Together with a selection transistor TNj3 to whose input connection ES<j> a selection signal s<j> can be applied, these form a circuit arrangement which passes the input signals a<j>, aq<j> to first lines AL1, AL2. The selection transistors TNj3 are connected between a reference ground potential connection BP and the respective source connections of the transistors TNj1, TNj2. The signals are output only when the transistor TNj3 is switched on. Since the arrangement forms a multiplexer, only one of the n transistors TNj3 can ever be switched on. A signal which switches them off is applied to the other transistors.

The first lines or output lines AL1, AL2 are connected to first connections AA1, AA2 at which the input signal a<j>, aq<j> which is applied from the input connections EA1<j>, EA2<j> can be tapped off. This dual rail signal which can be tapped off at the first connections or at the output connections AA1, AA2 is annotated z, zq.

A storage cell SZ1 is connected to the first connections AA1, AA2. The storage cell SZ1 comprises two inverters which are connected to one another. The first inverter is formed by the transistors TNz2, TPz2. The second inverter is formed by the transistors TPz1, TNz1. The storage cell SZ1 furthermore has a selection transistor TNz3, to whose control connection a clock signal h can be applied. The selection transistor TNz3 is connected between the reference ground potential connection BP and the inverters. The outputs of the inverters are connected to the first lines AL1, AL2.

When the logic value of the clock signal h is 0, then the value which is present on the first lines AL1, AL2 is written to the storage cell SZ1. When the clock signal changes from logic 0 to logic 1, then the value in the storage cell SZ1 is retained, since the inverters are connected to the reference ground potential through the switched-on selection transistor TNz3.

In a security mode, the circuit operates with full dual rail functionality including consistent use of precharge states. In a corresponding manner, the first lines AL1, AL2 are switched to a precharge state after a logically valid state, in which precharge state the same potential is applied to the first lines AL1, AL2. In the present integrated circuit, this is achieved by the means VE1, which may be referred to as a precharging device. The precharging of the first and second lines AL1, AL2 is initiated as soon as the clock signal h changes its value from logic 1 to logic 0. The means VE1 comprises two transistors TPP1, TPP2, to each of which the same control signal pq is applied. The control signal pq is a periodic signal which is coupled in a fixed form to the clock signal h. The transistors TPP1, TPP2 in the means VE1 are connected between a supply potential connection VP under the first lines AL1, AL2. The first lines AL1, AL2 thus assume the value (1,1) in their precharge state.

A data transmission device DE1 comprising the transistors TP01, TP02 and the selection transistor TP03 transmits the signals on the first lines AL1, AL2 to second lines ZL1, ZL2. For this purpose, the data transmission device DE1 must be switched to be active via the selection transistor TP03. The selection signal sq applied to the selection transistor TP03 is synchronized to the clock signal h, so that periodic data transmission takes place. The data is thus transmitted from the first storage cell SZ1 to a second storage cell SZ2.

The second storage cell SZ2 is likewise formed by inverters which are connected to one another. The first inverter is formed by the transistors TPy1, TNy1. The second inverter is formed by the transistors TPy2, TNy2. The output of the inverters is connected to the second lines ZL1, ZL2.

Temporary storage in the second storage cell SZ2 takes place only when it is switched to be active via a selection transistor TPy3, to which the clock signal h is applied. The selection transistor TPy3 is in the present case connected between the supply potential connection VP and the inverters which are connected to one another.

In order to achieve the desired charge neutrality on the second lines ZL1, ZL2 as well, a means VE2 for precharging these lines is also associated with the second lines ZL1, ZL2, and can likewise be referred to as a precharging device. The means VE2 has the transistors TNP1, TNP2, to each of which the same control signal p is applied. The means VE2 is connected between the second lines ZL1, ZL2 and the reference ground potential connection BP.

As has already been explained above, states which necessitate a temporary interruption in the program sequence occur during the step-by-step processing of an algorithm in modern processors. The information which exists at the time of the interruption should in this case be retained completely. The second storage cell SZ2 is used for this purpose. This ensures that the states reached in the program flow can be frozen. When the program sequence can be continued, the data stored in the second storage cell SZ2 can then once again be transmitted to the first connections AA1, AA2 via the second data transmission device DE2, which is connected between the output of the second storage cell SZ2 and the first lines AL1, AL2.

In principle, the design of the second data transmission device DE2 is similar to that of the first data transmission device DE1. A selection transistor TN03 to which a control signal s<0> can be applied is connected between the reference ground potential connection BP and the two switching elements TN01, TL02. The control connections of the transistors TN01, TN02 are connected to the second lines ZL1, ZL2. The drain connections of the transistors TN01, TN02 have a respective connection to the first lines AL1, AL2.

In consequence, the content of a data path register is frozen via feedback. In this case, the data signal which is applied to the first connections—the output connections—is in principle temporarily stored in a second storage cell. The value which is stored in the second storage cell SZ2 can be fed back at any desired time via the second data transmission device DE2 to the first connections.

The method of operation of the integrated circuit when in the security mode will be explained in more detail in the following text with reference to FIG. 6. The waveform of the data and control signals is subdivided into six time intervals ZI1 to ZI6. The signals h (clock signal), pq, s<j>, s<0>, p and sq denote control signals which are applied to respective circuit blocks that are shown in FIG. 5. The control signals are produced by the control apparatus 22. The data signals which are applied to the input connections, the first and second connections, are annotated a/aq<j>, z/zq and y/yq.

First of all, with regard to the first time interval ZI1 mentioned, when h=1, a value (z, zq)=(d0, d0q)=d0* which has previously been transmitted via one of the multiplexer inputs (EA1<j>, EA2<j>) to the first connections AA1, AA2 is retained by the storage cell SZ1. This is dependent on the control signal pq, which can be associated with the means for precharging of the output lines AL1, AL2, being at the logic value 1, and all of the control signals s<j>, where j=1, ... n, as well as s<0> being at the logic value 0. In consequence, neither the means for precharging of the output lines VE1 nor the multiplexer inputs ES<j> are active.

At the start of the time interval ZI1, the second lines ZL1, ZL2 are precharged to the value (0, 0) via the second precharging unit VE2 (control signal p=1). Once the control signal p has assumed its value, and the control signal sq has at the same time reached the logic value 0 with its falling edge, the value d0* is written via the first data transmission unit DE1 based on (y, yq). In the next time interval ZI2, this value, which is now stored in the second storage cell SZ2, is retained with sq=1, p=0 and h=0.

At the same time, at the start of the time interval ZI2, the first lines AL1, AL2 are precharged via pq=0 to (z, zq)=(1,1). The value d1*=(agj>, aq<j>)=(d1, d1q) which has in the meantime been applied to the input connections EA1<j>, EA2<j> is then written with pq=1 and s<j>=1, based on (z, zq).

Since the circuit is designed using dual rail technology, the input lines which are connected to the input connections EA1, EA2 also have a precharging unit. This results in two possible alternatives for the time response of the input signal (agj>, aq<j>), the first of which is illustrated in the time interval ZI2, with the second alternative being illustrated in the time interval ZI6.

Before one of the multiplexer inputs j is opened by the control signal s<j>=1 (that is to say as long as s<j>=0) the input lines which are connected to the input connections EA1, EA2 and are located upstream of the input of the register (not shown in FIG. 5) are precharged to a value (0,0). The input signals (a<j>, aq<j>) thus have the valid logic value dl* either before or after the multiplexer input has been activated.

In the second alternative, the input lines which are connected to the input connections EA1, EA2 are not precharged. The input signals (a<j>, aq<j>) must in this variant, however, have reached the valid logic value (in this case d3*) in a stable form before one of the multiplexer inputs ES<j> is opened by s<j>=1.

The time interval ZI3 corresponds to the time interval ZI1. As long as the clock signal h is at the logic value 1, the value dl* is retained in the first storage cell SZ1, the value (z/zq). As described above, the value d1* is written to the second storage cell SZ2.

The time interval ZI4 corresponds to the time interval ZI2. As long as the clock signal h is at the logic value 0, the value dl* is retained in the second storage cell SZ2, that is to say d1*=(y, yq). Since, as a consequence of the falling clock edge h, the control signal sq changes its logic value to 0, the output lines AL1, AL2 which are connected to the first connections AA1, AA2 are precharged to (z, zq)=(1,1). Once the first precharging unit VE1 has been switched to be inactive again by sq=1, a new signal can be applied to the first connections AA1, AA2.

In contrast to the time interval ZI2, none of the muliplexer inputs EA1, EA2 are now switched to be active, but the second data transmission unit DE2 is switched to be active via the selection signal s<0>. The data transmission unit DE2 thus transmits the value dl* to the output connections AA1, AA2, which means that (z, zq)=d1*.

The case of data feedback is thus illustrated in the time interval ZI4. The data item dl* is thus frozen. This means that the value d1* which was first of all transmitted from the first storage cell SZ1 to the second storage cell SZ2 in the time interval ZI2, is written back to the first storage cell SZ1 again in the time interval ZI4. Since the node pairs, that is to say the respective lines AL1, AL2 and ZL1, ZL2, have been respectively precharged to (1,1) and (0,0) between two respective writing processes for (z, zq) and (y, yq), the charge integrals are not only independent of the data changes at the data input, but are also independent of whether new data has been transferred from the data input to the first storage cell SZ1 or has been fed back from the second storage cell SZ2 to the first storage cell SZ1. However, this situation occurs only in the case illustrated in the time intervals ZI2 and ZI4, where the to the input connections EA1<j>, EA2<j> have been precharged to the value (0,0) before they assume their valid logic value. In the situation illustrated in the time interval ZI6, the charge integral is independent of data changes from the first storage cell SZ1 to the second storage cell SZ2, but is not independent of data changes at the input connections EA1<j>, EA2<j>.

In the circuit arrangement illustrated in FIG. 5, the transistor groups (which are "responsible" for the data signal (y, yq)) in the second storage cell SZ2, in the second precharging device VE2 and in the second data transmission device DE2 are complementary to the transistor groups which relate to the data signal (z, zq). In this case, the expression complementary means that the N and P-channel transistors have been interchanged.

When the control signal at the second input 4 of the control device 22 is sm=0, the data path register 21 is intended to be operated in the power saving mode. In this case, the "dynamic freezing" of the register state as described above, that is to say the periodically alternating copying of (z, zq) after (y, yq) and of (y, yq) back after (z, zq) is replaced by "static freezing" of the state of (z, zq). This is achieved by applying a predetermined signal combination to the drive signals s<j>, h, pq, sq and p. In the described exemplary embodiment, the signal combination is: s<j>=0 for all j=0, 1 . . . n, h=1, pq=1, sq=1 and p=0. This means that, when sm=0, neither (y, yq) is written, nor is it copied after (z, zq). At the times when data is intended to be transferred, one of the s<k>, k∈{1, 2, . . . n} is active. Thus, when the state of the system is intended to be frozen, (z, zq) is locked, as illustrated in FIG. 7, in the state which was last written via one of the data inputs a<j>, aq<j>. FIG. 7 also shows the signal waveforms for sm=0. In the case of "static freezing", s<0> is always 0, p is always 0, and sq is always 1.

The switching between two operating modes, the security mode and the power saving mode, according to the invention, is thus carried out in a simple manner in that the control unit 22 either produces the drive signals for the data path register such that periodically alternating copying takes place, or else produces it such that periodic copying does not take place. The externally visible logic functionality of the register is the same in both cases, but the power consumption of the circuit differs. While the current profile of the circuit arrangement in the power saving mode is dependent on the processed data, and conclusions about the processed data can be drawn by means of differential current profile analysis, the current profile in the security mode does not allow any conclusions to be drawn about the processed data, that is to say it is DPA-resistant.

The invention has been described with reference to use with a SRAM storage unit and a data path register. A further exemplary embodiment of the idea according to the invention of switchable charge neutrality is so-called "register files". A register file is generally used for various purposes. On the one hand, it is intended for the temporary storage of addresses and data which are or is required for the tasks currently being carried out by the CPU. On the other hand, it is intended for rapid, random and simultaneous read access to in general at least two operands. It can also be used for rapid, random write accesses at the same time as read accesses. These are so-called write back ports of the register file, which are used for writing back the results or intermediate results of computation operations. In order to make it possible to satisfy all of these requirements, register files are configured as so-called multiport RAMs. These are registers which are interconnected via their bit line groups, with the functional unit "register" in this case being defined as a set of identical so-called one-bit register cells with the characteristics mentioned above. The number of bits which can be stored in a register in general corresponds to the bit length of the data path. The number of ports corresponds to the maximum number of different accesses which are intended to be possible at the same time to different registers.

In a security mode, multiport RAMs according to the invention are operated in such a way that all of the bit line pairs which are associated with all of the ports always have their charges reversed in each CPU clock cycle. In contrast, in the power saving mode, only those bit line pairs which are carrying information that is currently required for the operation of the CPU have their charges reversed in a given clock cycle.

The application of the operating mode switching according to the invention to other circuit components is within the scope of specialist knowledge.

What is claimed is:

1. A data processing apparatus comprising:
   at least one dual rail circuit component configured to operate in a security mode or in a power saving mode, wherein complementary data is processed in the security mode and the power saving mode; and
   a control unit, which is coupled to the at least one dual rail circuit component, the control unit being configured to:
   a) receive an operating mode selection signal,
   b) produce drive signals for the at least one dual rail circuit component in response to the operating mode selection signal, the at least one dual rail circuit component operating in a security mode or in a power saving mode as a function of the drive signals, and
   c) deactivate security measures of the at least one dual rail circuit component when it is operating in the power saving mode.

2. The data processing apparatus as claimed in claim 1, wherein a same functionality of the at least one dual rail circuit component is provided in the power saving mode and in the security mode.

3. The data processing apparatus as claimed in claim 1, wherein the at least one dual rail circuit component is a storage apparatus with an upstream precharge unit, which can be deactivated by a precharge control signal while reading data.

4. Use of the data processing apparatus as claimed in claim 1 in a smart card.

5. A method for operation of a dual rail circuit component, comprising:
   operating the dual rail circuit component alternatively in a security mode or in a power saving mode; and
   deactivating security measures in the power saving mode, wherein complimentary data is processed in the security mode and the power saving mode.

6. A data processing apparatus having a dual rail circuit component alternatively operated in a security mode or in a power saving mode, with security measures being deactivated in the power saving mode, wherein complimentary data is processed in the security mode and the power saving mode.

7. A method for operating a data processing apparatus having a dual rail circuit component and a control unit, which is coupled to the dual rail circuit component, for production of drive signals for the dual rail circuit component, the method comprising:
   receiving at the control unit an operating mode selection signal;
   producing drive signals for the dual rail circuit component as a function of the operating mode selection signal;
   operating the circuit component in a security mode or in a power saving mode as a function of the drive signals, wherein complementary data is processed in the security mode and the power saving mode; and
   deactivating security measures in the power saving mode.

8. A system for operating a data processing apparatus having a dual rail circuit component and a control unit, which is coupled to the dual rail circuit component, for production of drive signals for the dual rail circuit component, the system comprising:
   means for receiving at the control unit an operating mode selection signal;
   means for producing drive signals for the dual rail circuit component as a function of the operating mode selection signal;
   means for operating the circuit component in a security mode or in a power saving mode as a function of the drive signals, wherein complementary data is processed in the security mode and the power saving mode; and
   means for deactivating security measures in the power saving mode.

9. A data processing apparatus comprising:
   at least one dual rail circuit component, wherein the dual rail circuit component is a data path register which is designed to dynamically freeze register states; and
   a control unit, which is coupled to the at least one dual rail circuit component, for production of drive signals for the dual rail circuit component,
   wherein the control unit receives an operating mode selection signal, drive signals for the at least one dual rail circuit component are produced as a function of the operating mode selection signal, and the at least one circuit component is operated in a security mode or in a power saving mode as a function of the drive signals, with security measures being deactivated in the power saving mode, and wherein the control unit is designed to produce a control signal combination in which static freezing rather than dynamic freezing takes place in the power saving mode.

10. The data processing apparatus as claimed in claim 9, wherein dynamic freezing is carried out by periodic, alternating copying of signal states between two storage cells, and the periodic, alternating copying between the storage cells is prevented during static freezing.

11. A method for operation of a dual rail circuit component, comprising:
   operating the dual rail circuit component alternatively in a security mode or in a power saving mode;
   deactivating security measures in the power saving mode; and
   driving the dual rail circuit component by drive signals by:
   supplying the drive signals in the security mode, by means of which precharge states are inserted between valid dual rail signal states for dual rail signals within the dual rail circuit component; and
   supplying the drive signals in the power saving mode, by means of which precharge states are inserted between valid dual rail signal states for dual rail signals within the dual rail circuit component only when this is necessary for the operation of the component to which the dual rail signal is applied.

* * * * *